United States Patent
Rao et al.

(10) Patent No.: US 10,243,891 B2
(45) Date of Patent: Mar. 26, 2019

(54) CROSS-DEVICE INTEGRATION SYSTEM AND METHOD

(71) Applicant: OATH INC., New York, NY (US)

(72) Inventors: Supreeth Rao, Sunnyvale, CA (US); Sudharsan Vasudevan, Santa Clara, CA (US); Seema Kamath, Stanford, CA (US); Swapnil Patel, San Jose, CA (US); Utkarsh Shrivastava, San Jose, CA (US); Varun Bhagwan, San Jose, CA (US); Kaushal Kurapati, Cupertino, CA (US); Patrick Mason, Redwood City, CA (US)

(73) Assignee: OATH INC., New York, NY (US)

( * ) Notice: Subject to any disclaimer, the term of this patent is extended or adjusted under 35 U.S.C. 154(b) by 570 days.

(21) Appl. No.: 14/460,016

(22) Filed: Aug. 14, 2014

(65) Prior Publication Data
US 2016/0050254 A1 Feb. 18, 2016

(51) Int. Cl.
*G06F 3/0481* (2013.01)
*H04L 12/58* (2006.01)
*G06Q 10/00* (2012.01)

(52) U.S. Cl.
CPC ............ *H04L 51/04* (2013.01); *G06Q 10/00* (2013.01); *H04L 51/22* (2013.01); *G06F 3/0481* (2013.01)

(58) Field of Classification Search
CPC ....................... G06F 3/0481–3/0489
See application file for complete search history.

(56) References Cited

U.S. PATENT DOCUMENTS

| | | | | |
|---|---|---|---|---|
| 6,034,621 A * | 3/2000 | Kaufman | ............... | G06Q 99/00 340/7.21 |
| 6,349,337 B1 * | 2/2002 | Parsons, Jr. | ............. | H04L 29/06 709/227 |
| 7,127,509 B2 * | 10/2006 | Wu | ................... | G06F 17/30581 707/999.201 |
| 7,346,766 B2 * | 3/2008 | Mackin | ................. | G06F 9/4451 713/1 |
| 7,475,395 B2 * | 1/2009 | Etelapera | ................. | G06F 8/65 717/172 |
| 7,613,834 B1 * | 11/2009 | Pallipuram | ....... | G06F 17/30578 709/203 |
| 7,761,414 B2 * | 7/2010 | Freedman | ......... | G06F 17/30578 707/610 |
| 8,019,863 B2 * | 9/2011 | Jeide | ................... | H04L 67/1095 709/223 |
| 8,135,865 B2 * | 3/2012 | Fleischman | ............ | G11B 27/10 707/610 |
| 8,190,749 B1 * | 5/2012 | Chi | ........................ | G02B 27/01 709/201 |

(Continued)

FOREIGN PATENT DOCUMENTS

WO WO 2015084750 * 6/2015 ............. G06F 3/041

*Primary Examiner* — Steven B Theriault
(74) *Attorney, Agent, or Firm* — James J. DeCarlo; Greenberg Traurig, LLP

(57) ABSTRACT

A cross-device messaging integration capability is disclosed, which allows a user using a first device to indicate, using a first user computing device, an intent to perform one or more messaging actions at one or more second user computing device(s). The first and second devices may be different devices. The user may receive a reminder or other notification of the user's intent at the second device(s).

63 Claims, 8 Drawing Sheets

(56) References Cited

U.S. PATENT DOCUMENTS

| | | | | |
|---|---|---|---|---|
| 8,442,943 B2* | 5/2013 | Multer | H04L 67/1095 | 707/621 |
| 8,645,471 B2* | 2/2014 | Onyon | G06Q 10/107 | 455/466 |
| 8,819,798 B2* | 8/2014 | Zises | G06F 21/32 | 726/7 |
| 8,850,045 B2* | 9/2014 | Berg | H04L 63/08 | 709/225 |
| 8,964,947 B1* | 2/2015 | Noolu | H04M 3/541 | 379/88.01 |
| 8,996,729 B2* | 3/2015 | Taivalsaari | G06Q 10/101 | 709/248 |
| 9,098,177 B2* | 8/2015 | Das | G06F 3/04842 | |
| 9,098,357 B2* | 8/2015 | Uola | G06F 9/542 | |
| 9,107,155 B2* | 8/2015 | Charbit | H04W 56/0045 | |
| 9,154,606 B2* | 10/2015 | Tseng | H04M 1/72552 | |
| 9,185,742 B2* | 11/2015 | Das | H04W 84/18 | |
| 9,288,164 B2* | 3/2016 | Vyrros | H04L 51/00 | |
| 9,378,456 B2* | 6/2016 | White | G06F 9/4856 | |
| 9,384,290 B1* | 7/2016 | Liu | G06F 17/3087 | |
| 9,479,568 B2* | 10/2016 | Collin | G06F 3/04842 | |
| 9,703,370 B2* | 7/2017 | Bukurak | G06F 9/4856 | |
| 2002/0065946 A1* | 5/2002 | Narayan | G06F 9/548 | 719/315 |
| 2002/0087632 A1* | 7/2002 | Keskar | H04L 67/306 | 709/204 |
| 2002/0116405 A1* | 8/2002 | Bodnar | G06F 17/30575 | |
| 2002/0129126 A1* | 9/2002 | Chu | G06F 8/20 | 709/220 |
| 2003/0191807 A1* | 10/2003 | Olson | H04W 4/00 | 709/206 |
| 2003/0195963 A1* | 10/2003 | Song | G06F 17/30861 | 709/227 |
| 2004/0054711 A1* | 3/2004 | Multer | H04L 67/1095 | 709/201 |
| 2004/0093342 A1* | 5/2004 | Arbo | G06F 17/30569 | |
| 2004/0142711 A1* | 7/2004 | Mahonen | H04M 1/72527 | 455/502 |
| 2004/0148375 A1* | 7/2004 | Levett | G06F 9/46 | 709/223 |
| 2004/0225731 A1* | 11/2004 | Piispanen | G06F 17/30581 | 709/224 |
| 2005/0125459 A1* | 6/2005 | Sutinen | G06F 17/30581 | |
| 2005/0147130 A1* | 7/2005 | Hurwitz | G06F 17/30578 | 370/503 |
| 2006/0031587 A1* | 2/2006 | Paterson | G06F 17/30581 | 709/248 |
| 2006/0101082 A1* | 5/2006 | Agrawal | G06F 17/30575 | |
| 2006/0242278 A1* | 10/2006 | Hawkins | H04M 1/72527 | 709/221 |
| 2007/0130217 A1* | 6/2007 | Linyard | G06F 17/30581 | |
| 2007/0209005 A1* | 9/2007 | Shaver | G06F 17/3089 | 715/733 |
| 2007/0271317 A1* | 11/2007 | Carmel | G06F 17/30575 | |
| 2008/0059656 A1* | 3/2008 | Saliba | G06F 17/30017 | 709/248 |
| 2008/0085682 A1* | 4/2008 | Rao | H04M 1/7253 | 455/74 |
| 2008/0160974 A1* | 7/2008 | Vartiainen | G06F 9/4856 | 455/414.3 |
| 2008/0168106 A1* | 7/2008 | Freedman | G06F 17/30575 | |
| 2008/0207184 A1* | 8/2008 | Wassingbo | H04M 1/7253 | 455/417 |
| 2008/0288578 A1* | 11/2008 | Silfverberg | G06F 17/30581 | 709/203 |
| 2009/0220066 A1* | 9/2009 | Shaffer | H04M 3/56 | 379/204.01 |
| 2009/0254620 A1* | 10/2009 | Best | G06Q 10/107 | 709/206 |
| 2009/0303066 A1* | 12/2009 | Lee | H04M 3/42136 | 340/679 |
| 2010/0085857 A1* | 4/2010 | Herz | H04N 21/4126 | 369/100 |
| 2011/0289172 A1* | 11/2011 | Marcellino | H04L 51/24 | 709/206 |
| 2012/0011511 A1* | 1/2012 | Horvitz | G06F 9/461 | 718/100 |
| 2012/0084341 A1* | 4/2012 | Mantri | H04M 3/42178 | 709/203 |
| 2013/0006650 A1* | 1/2013 | Bocirnea | G06Q 10/10 | 705/2 |
| 2013/0046893 A1* | 2/2013 | Hauser | G06F 9/4856 | 709/226 |
| 2013/0197679 A1* | 8/2013 | Balakrishnan | G06F 17/40 | 700/91 |
| 2013/0198392 A1* | 8/2013 | Hymel | G06F 3/013 | 709/227 |
| 2013/0347044 A1* | 12/2013 | Lee | H04N 21/2387 | 725/88 |
| 2014/0006525 A1* | 1/2014 | Freund | H04L 51/16 | 709/206 |
| 2014/0073300 A1* | 3/2014 | Leeder | H04B 5/0031 | 455/416 |
| 2014/0095673 A1* | 4/2014 | Mao | H04L 67/02 | 709/219 |
| 2014/0208336 A1* | 7/2014 | Shia | G06Q 10/10 | 719/318 |
| 2014/0229853 A1* | 8/2014 | Cho | G06Q 10/20 | 715/752 |
| 2014/0258357 A1* | 9/2014 | Singh | H04L 67/10 | 709/201 |
| 2014/0325382 A1* | 10/2014 | Brown | G06F 3/0486 | 715/748 |
| 2014/0344721 A1* | 11/2014 | Prakash | H04M 1/274508 | 715/753 |
| 2014/0359637 A1* | 12/2014 | Yan | G06F 9/4881 | 718/108 |
| 2015/0026237 A1* | 1/2015 | Kaplinger | G06F 17/30174 | 709/203 |
| 2015/0188871 A1* | 7/2015 | Lewis | H04L 51/24 | 709/207 |
| 2016/0342673 A1* | 11/2016 | Tewari | G06F 17/30575 | |

* cited by examiner

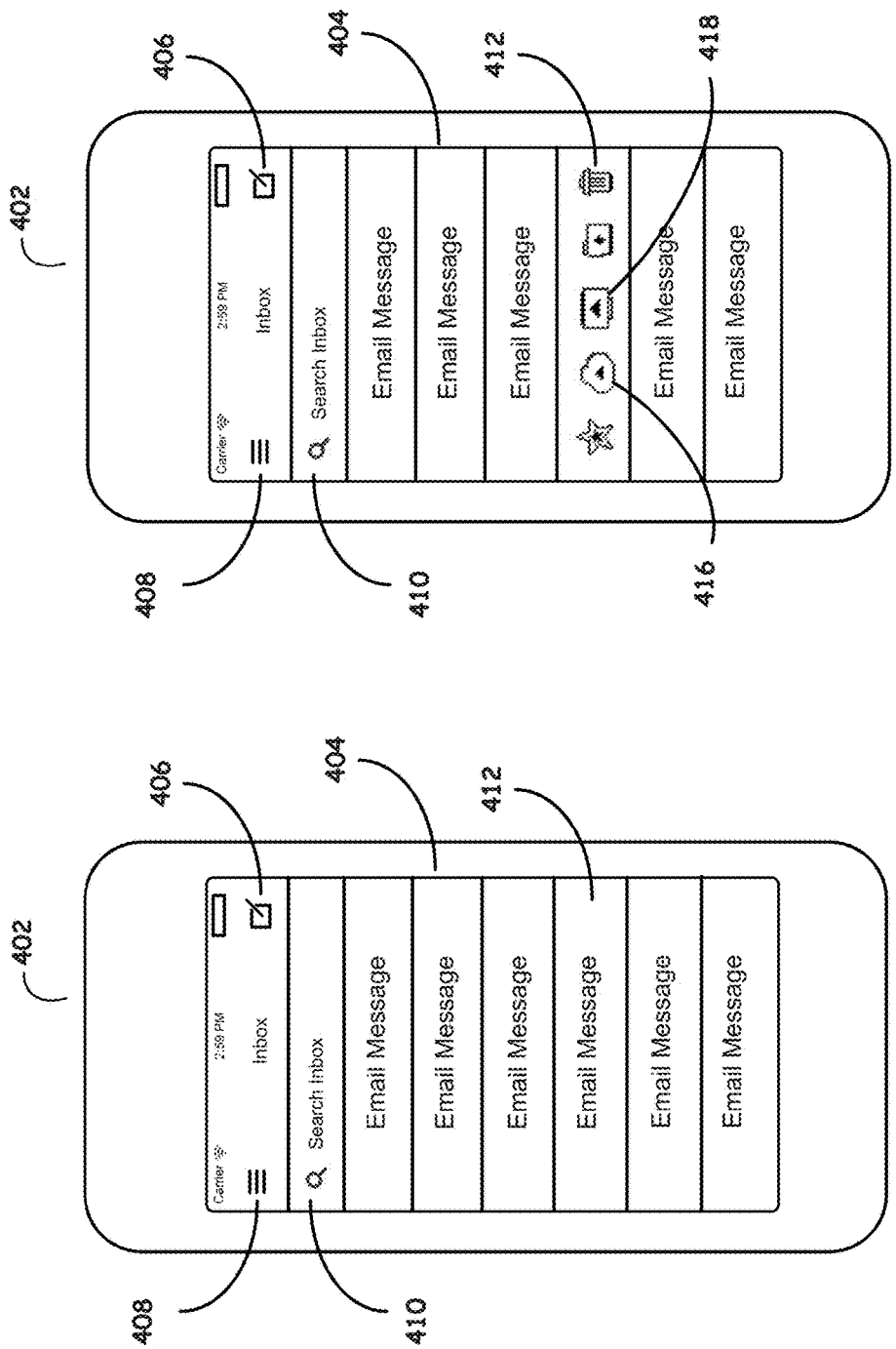

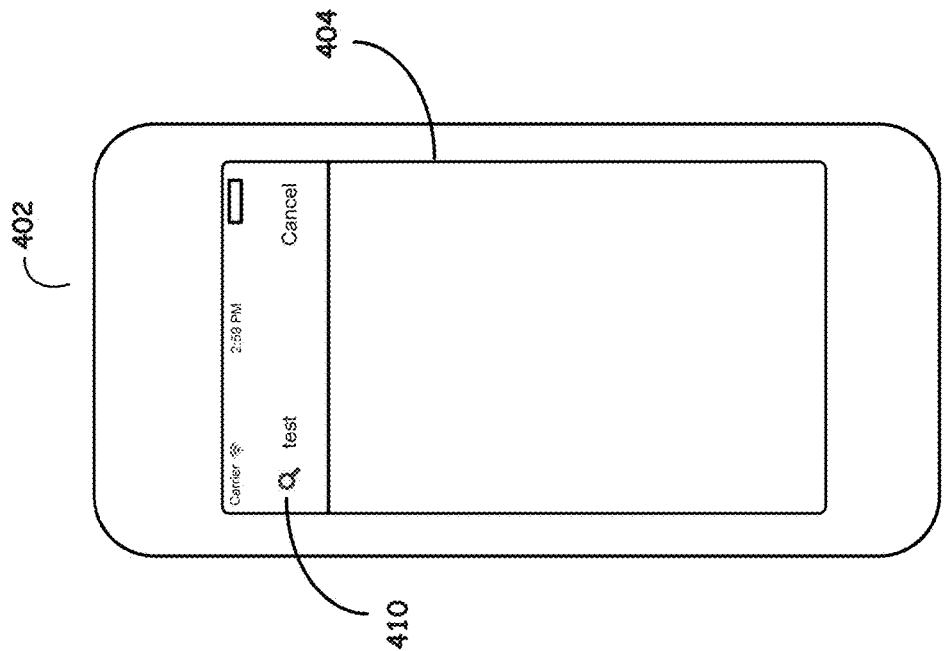
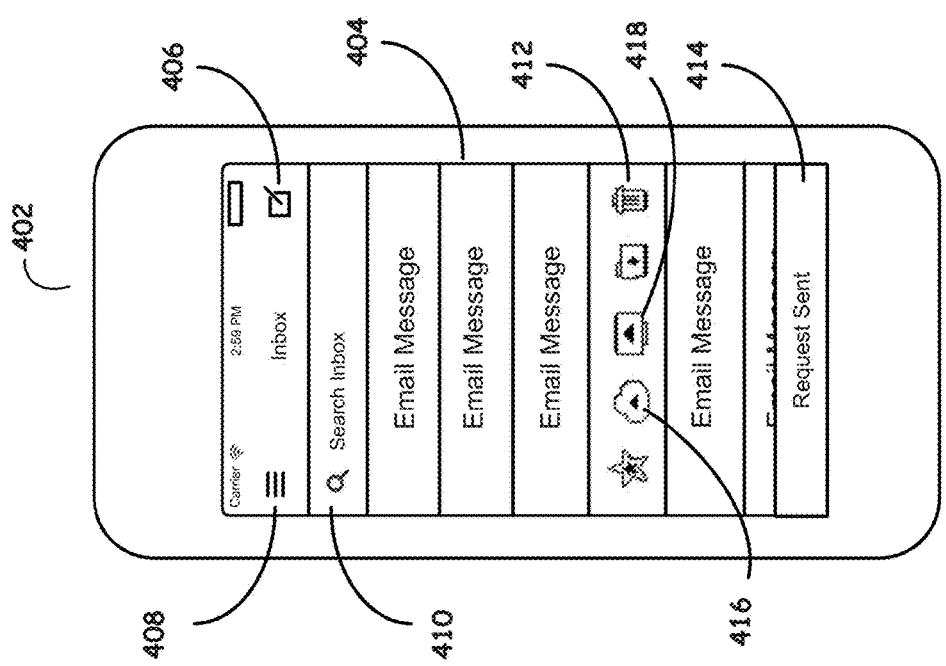

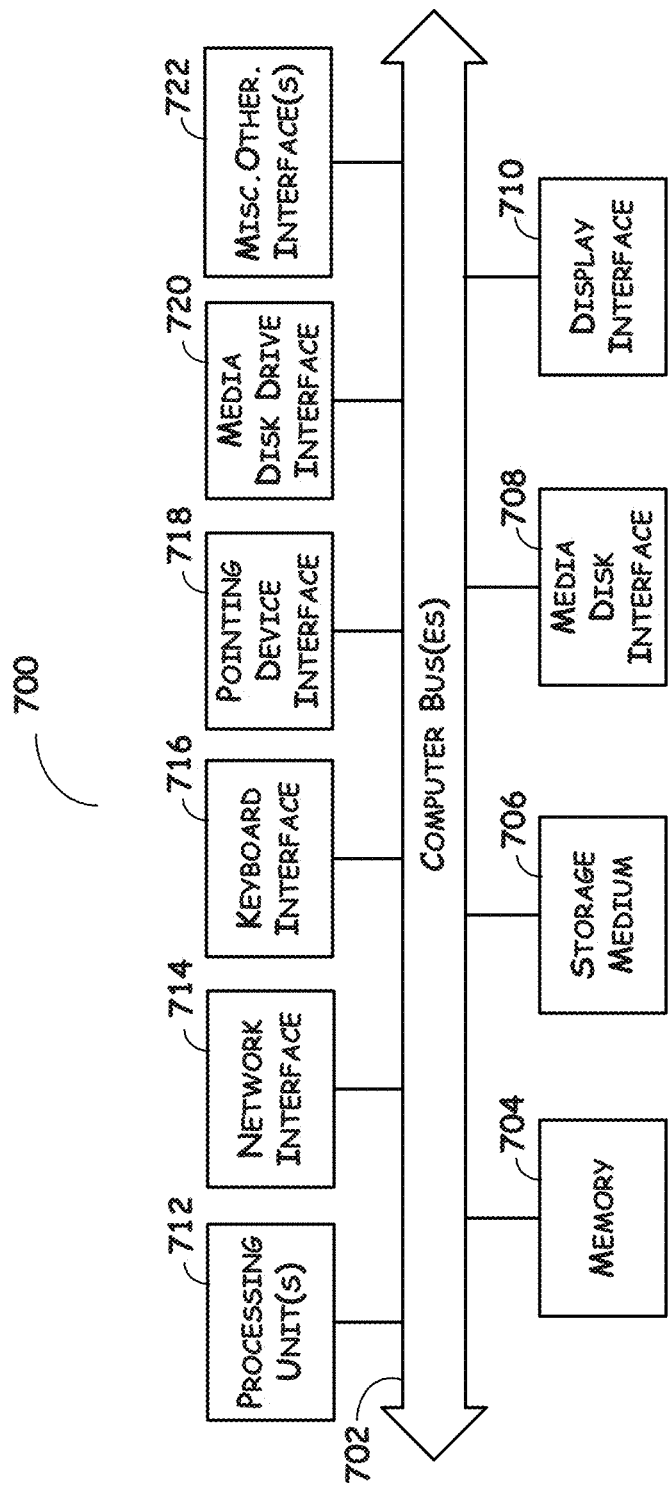

CROSS-DEVICE INTEGRATION SYSTEM AND METHOD

FIELD OF THE DISCLOSURE

The present invention relates to user selection of a device to operate on a message, such as an electronic mail message, and more particularly, to providing a mechanism to facilitate a user's device selection.

BACKGROUND

Most every computer user uses at least one messaging service, such as an electronic mail messaging service, and some users have more than one messaging account provided by the same or different messaging service(s). A user may access a messaging service using any of a number of options. Many messaging services offer web access to its messaging services, which may be provided by one or more server computing device(s), using one or more web page(s), and the user may access the one or more web page(s) using a web browser executing on the user's computing device. Another option provided by some messaging services is an ability to use of a client application, such as an electronic mail client application, to access its messaging server(s). An electronic mail, or email, messaging service typically allows the user to perform such operations as create, send, forward, reply, open, forward, etc. an email message.

SUMMARY

While a user may have various options for accessing and operating on messages, the options are not integrated at least from the perspective of the user and the user's computing devices. For example, a user may wish to perform an operation on one or more messages using a client computing device other than the one the user is currently using to access a messaging service. It would be beneficial for the user to be able to integrate the user's experience across multiple user computing devices and/or client applications, such that while accessing the messaging service using one user computing device and corresponding client application, the user is able to identify one or more messages that the user would like to handle using another user computing device and corresponding client application.

The present disclosure seeks to address failings in the art and to provide cross-device integration, which may be used for cross-integration of the user's messaging activity. In accordance with one or more embodiments, the user may use one user computing device to access a messaging service and select one or more messages that the user would like to handle using another user computing device and client application. In accordance with one or more such embodiments, the user might use one client application executing on one of the user's computing devices to select the message(s), identify the type of action(s) the user wishes to take on each message, and identify another user computing device, which provides a messaging application, that the user wishes to use to perform the identified action(s).

By way of a non-limiting example, the user might open an email message using the user's smartphone using a web browser application, an email client application, etc. The user reads the email using the smartphone, but the user would like to respond to the email using a different computing device, such as the user's desktop computer, laptop computer, tablet, etc. Embodiments of the present disclosure allow the user to indicate that the user wishes, or intends, to respond to the email but to do so using another, different, device, which may be identified by the user. The user's input may create an event, and the user may be notified of the event on the other device. By way of a non-limiting example, a notification may be provided to the user when the user invokes a client application on the other device to access the user's messages. Where the client application is open on the other client device when the event is created, the notification may be made instantaneously. As yet another non-limiting example, the user may set a timing for the notification, so that the notification may be made according to the timing set by the user. By way of yet another non-limiting example, the user may request one or more reminders that may be provided to the user by way of one or more of the user's computing devices.

In accordance with one or more embodiments, a method is provided, the method comprising receiving, by at least one computing device, a user request from a first computing device, the user request comprising information indicating the user's intent to perform at least one messaging action in connection with at least one message; generating, by the at least one computing device and in response to the received request, at least one messaging event, each messaging event corresponding to a messaging action and comprising information identifying at least one second computing device different than the first computing device usable to perform the messaging action; and generating, by the at least one computing device, at least one notification of the event for transmission to the at least one second computing device, the at least one notification comprising information about the messaging action.

In accordance with one or more embodiments, a method is provided, the method comprising receiving, by a first computing device, input from a user interface display at the first computing device, the input indicating the user's intent to perform at least one messaging action at one or more second computing devices different from the first computing device; and causing, by the first computing device and in response to the received input, one or more messaging events to be generated, each messaging event corresponding to a messaging action and comprising information identifying at least one second computing device different than the first computing device and identifying the messaging action.

In accordance with one or more embodiments a system is provided, which system comprises at least one computing device comprising one or more processors to execute and memory to store instructions to receive a user request from a first computing device, the user request comprising information indicating the user's intent to perform at least one messaging action in connection with at least one message; generate, in response to the received request, at least one messaging event, each messaging event corresponding to a messaging action and comprising information identifying at least one second computing device different than the first computing device usable to perform the messaging action; and generate at least one notification of the event for transmission to the at least one second computing device, the at least one notification comprising information about the messaging action.

In accordance with one or more embodiments a system is provided, which system comprises at least one computing device comprising one or more processors to execute and memory to store instructions to receive input from a user interface display, the input indicating the user's intent to perform at least one messaging action at one or more second computing devices different from the first computing device; and cause, in response to the received input, one or more messaging events to be generated, each messaging event corresponding to a messaging action and comprising information identifying at least one second computing device different than a first computing device and identifying the messaging action.

In accordance with yet another aspect of the disclosure, a computer readable non-transitory storage medium is provided, the medium for tangibly storing thereon computer readable instructions that when executed cause at least one processor to receive a user request from a first computing device, the user request comprising information indicating the user's intent to perform at least one messaging action in connection with at least one message; generate, in response to the received request, at least one messaging event, each messaging event corresponding to a messaging action and comprising information identifying at least one second computing device different than the first computing device usable to perform the messaging action; and generate at least one notification of the event for transmission to the at least one second computing device, the at least one notification comprising information about the messaging action.

In accordance with yet another aspect of the disclosure, a computer readable non-transitory storage medium is provided, the medium for tangibly storing thereon computer readable instructions that when executed cause at least one processor to receive input from a user interface display, the input indicating the user's intent to perform at least one messaging action at one or more second computing devices different from the first computing device; and cause, in response to the received input, one or more messaging events to be generated, each messaging event corresponding to a messaging action and comprising information identifying at least one second computing device different than a first computing device and identifying the messaging action.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides a general overview of components that may be used in accordance with one or more embodiments of the present disclosure.

FIG. 2 provides an example of a process flow that may be used in connection with one or more embodiments of the present disclosure.

FIG. 3, which comprises FIGS. 3A and 3B, provides process flow examples which may be implemented by a user computing device in accordance with one or more embodiments of the present disclosure.

FIG. 4, which comprises FIGS. 4A, 4B and 4C, provide examples of a user interface of a user computing device for use in accordance with one or more embodiments of the present disclosure.

FIG. 5, which comprises FIGS. 5A, 5B and 5C, provide examples of a user interface of a user computing device for use in accordance with one or more embodiments of the present disclosure.

FIG. 7 is a detailed block diagram illustrating an internal architecture of a computing device in accordance with one or more embodiments of the present disclosure.

DETAILED DESCRIPTION

Figure 1:
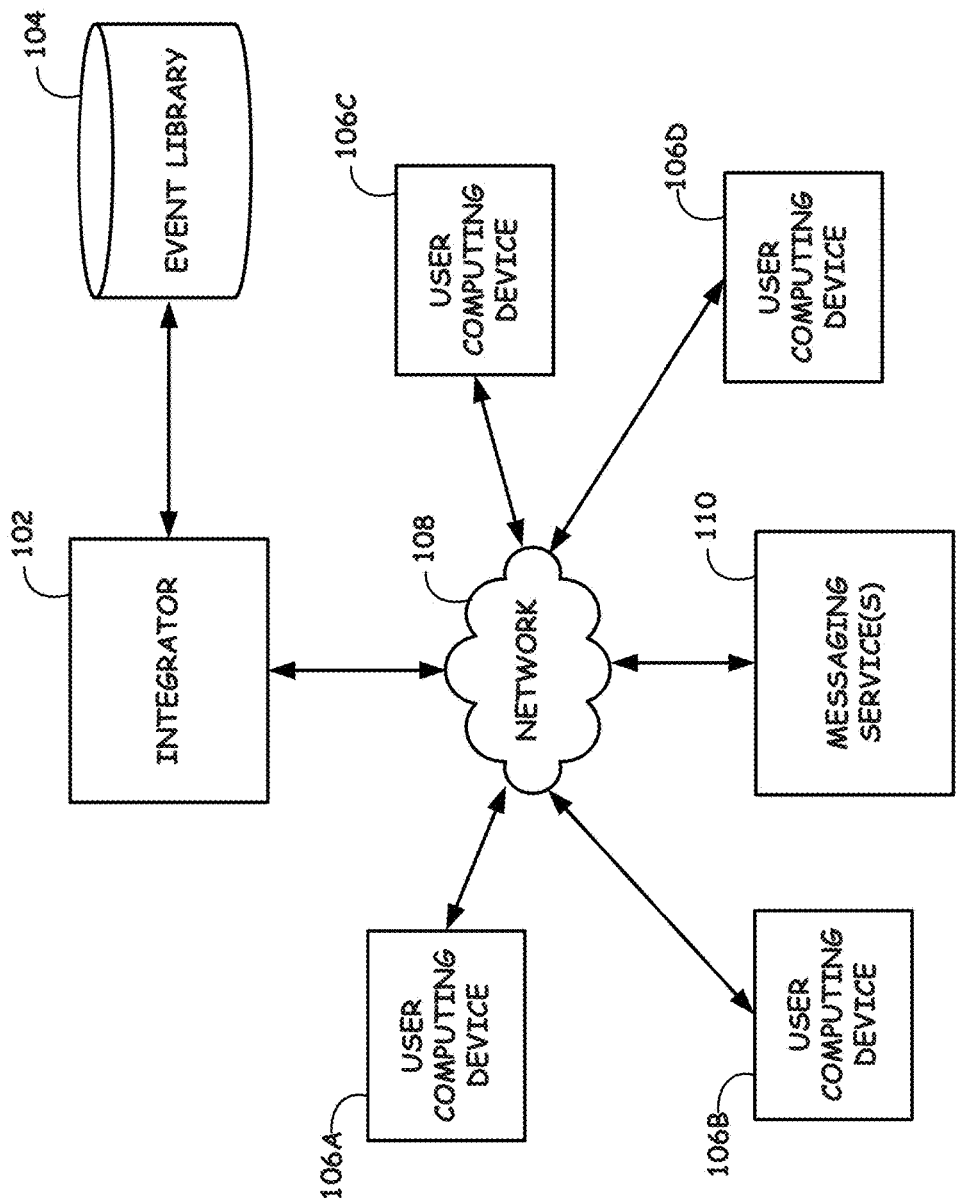

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a cross-device integration system, method and architecture. Embodiments of the present disclosure allow a user using a first computing device to choose at least one second computing device that the user wishes to use to perform an action or operation on a message, such as an email message. In accordance with one or more embodiments, the first and second devices may be different devices. Embodiments of the present disclosure allow the user to defer, e.g., temporally and/or from a device standpoint, messaging actions that the user wishes to perform at another time and/or using a different device than the one used by the user to indicate the user's intent to take the messaging action.

By way of a non-limiting example, the user may select a message using the first device and indicate an intent to perform an action, or operation, in connection with the selected message using the second device(s). In accordance with one or more embodiments, information indicative of the user's intent may be used to generate an event, or events, and a notification of the user's intent may be provided at the second device(s). By way of a non-limiting example, a notification might be in the form of a reminder, or reminders, displayed at the second device(s), such as and without limitation a list comprising one or more entries corresponding to the user's intended action(s). By way of some non-limiting examples, the reminder(s) might be in the form of one or more calendar entries, another email containing the reminder, a to-do list, etc.

By way of a further non-limiting example, a notification might comprise one or more operations being performed at the second device(s) in connection with the user's intended action(s), such as and without limitation opening one or more messages at the second device(s), performing a search, e.g. a search of a set of messages, at the second device(s) using search criteria specified by the user at the first device, and/or opening a new message at the second device(s). A reminder might be selectable by the user to perform the one or more operations, such as and without limitation open a corresponding email message that user has indicated an intent to read, send a reply, forward, etc., open a new email message, perform a search that the user indicated an intent to perform on the second computing device, etc.

The message may be an existing message or a new message. By way of a non-limiting example, the user might indicate an intent to read, reply, forward, delete, save, archive, etc. an existing message; the user might indicate an intent to create a new message.

FIG. 1 provides a general overview of components that may be used in accordance with one or more embodiments of the present disclosure. Devices 106, each of which may comprise a computing device for use by the user, may be connected to one or more messaging services 110 and may comprise one or more client applications for use in performing operations in connection with messages accessible via messaging service(s) 110. Each messaging service 110 may be implemented using one or more computing devices, e.g., server computing devices, which may store messages and forward messages to users via the users' computing device, e.g., user computing device 106, provide one or more web pages, etc. The user computing device 106 may comprise one or more client applications, which users may use to perform messaging operations, such as message access and management operations, in connection with messages stored and/or forwarded by the messaging service(s) 110. The one or more client application might also be used to access web pages made available via messaging service(s) 110 or another service available via network 106. By way of a non-limiting example, the user computing device(s) 106 may comprise an electronic mail, or email, messaging client application accessed via the user computer device(s) 106. Some non-limiting examples of email messaging clients include without limitation Yahoo!™ Mail web client, Microsoft™ Outlook client, Apple™ Mail, Microsoft™ Exchange, iCloud™, Google™, AOL™, Outlook.com™, etc.

Embodiments of the present disclosure are not limited to email messages, email applications and/or email messaging service(s). By way of some further non-limiting examples, embodiments of the present disclosure may be used with any messaging service, and a messaging service may comprise social media networking services, such as Facebook™, Twitter™, Instagram™, Flickr™, Tumblr™, MySpace™, Pinterest™, Snapchat™, Yelp™, corresponding client applications and messaging and/or posting capabilities.

A messaging service 110 may service multiples users, and each user may have one or more messaging accounts with a messaging service 110. A user's messaging account may be considered to correspond with a mailbox and/or a messaging address. In the case of email, a user may have an email address and may use one or more client applications to access the user's mailbox. A user may use more than one of the computing device(s) 106 to access the user's messages and/or mailbox. By way of a non-limiting example, the user computing devices 106 may comprise such computing devices as a smartphone, tablet, laptop, desktop, set-top box, etc.

By way of some non-limiting examples, a user might identify a message on the user's desktop computing device 106 that the user wishes to act on, e.g., read, on his mobile computing device 106, or conversely the user might identify a message on his mobile computing device 106 that the user would like to act on, e.g., reply to, on the user's desktop computing device 106. By way of another non-limiting example, the user might read a message on the user's desktop computing device 106, and decide to send a reply, with an attached photo that the user plans on taking, using the user's mobile computing device. As yet another non-limiting example, the user might perform a search for messages on the user's mobile computing device 106 using search criteria entered using the user's mobile computing device 106, and the user may wish to perform that search on another computing device 106, such as a tablet, laptop, desktop, etc. computing device 106.

In accordance with one or more embodiments, a user interface comprising one or more user interface controls, e.g., user-selectable icons, may be provided to the user at a first one of the computing device(s) 106. The user interface control(s) may be used by the user to indicate the user's intent to perform one or more messaging actions in connection with one or more messages at one or more second computing device(s) 106. Input indicative of the user's intent to perform the one or more messaging actions in connection with the one or more messages may be received from the user via the user interface control(s) and one or more computing devices, which may comprise one or more user computer devices and server computing devices. In accordance with one or more such embodiments, such input may be received by integrator 102, which may be coupled to the user computing device(s) 106 and the messaging service(s) 110 via network 108.

Figure 2:
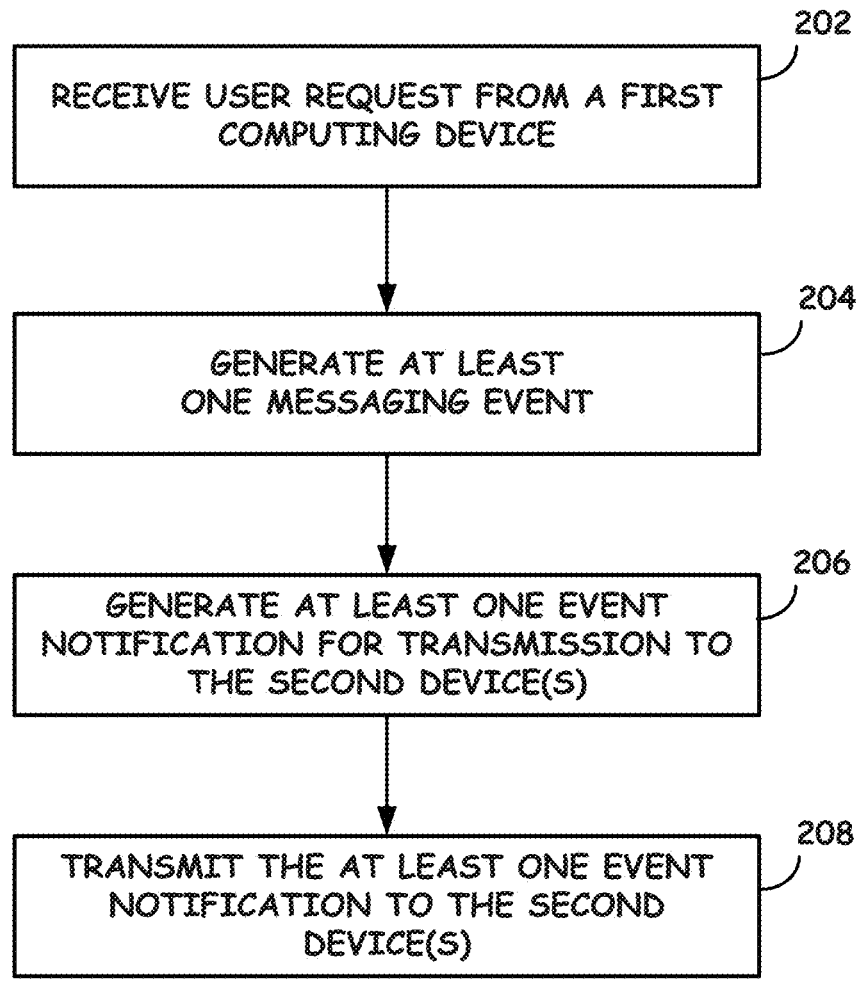

FIG. 2 provides an example of a process flow that may be used in connection with one or more embodiments of the present disclosure. In accordance with one or more embodiments, the process flow shown in the example of FIG. 2 may be performed by the integrator 102.

At step 202, the user input, which may be in the form of a user request, is received from a first computing device 106. By way of a non-limiting example, the user input may be received from a messaging application available via the first computing device 106. The user input is indicative of the user's intent to perform at least one messaging action in connection with at least one message of the messaging service(s) 110 at one or more second computing device(s) 106, which second computing device(s) 106 is/are different than the first computing device 106, from which the user input is received. By way of a non-limiting example, the at least one messaging action might be performed using a messaging application available via the one or more second computing device(s) 106.

In response, at step 204, the integrator 102 may generate one or more messaging events, which may be stored in event library 104 of FIG. 1. Each messaging event may correspond to one or more messaging actions. Each messaging event may have associated information, which information may identify at least one second computing device 106 other than the first computing device 106 that the user intends to use to perform the at least one messaging action in connection with the at least one message.

At step 206, the integrator 102 may generate one or more notifications of an event for transmission to the one or more second computing(s) 106, each notification of which may comprise information about the messaging action. At step 208, the integrator 102 may transmit the event notification(s) to the one or more second computing device(s) 106.

By way of a non-limiting example, the one or more event notifications may be generated, and/or transmitted, to the one or more second computing device(s) 106, based on a timing specified by the user. By way of a further non-limiting example, the user input might identify that the user wishes to perform the messaging action(s) immediately, or a present time, without deferring, or alternatively would like to defer performing the messaging action(s) until a future time. As yet another non-limiting example, the timing may be based on a determination of whether or not a messaging application is currently available, e.g., open, at a second computing device 106. If the messaging application is currently unavailable at a second computing device 106, the one or more event notifications might be generated, and/or transmitted, after the messaging application becomes available at the second computing device 106, e.g., upon a detection or indication that the messaging application has been open.

By way of some non-limiting examples, the event notification(s) may comprise information to be displayed to the user as a reminder of the user's intent to perform the messaging action(s), the event notification(s) may comprise one or more instructions for one or more operations to be carried out by a messaging application available at the second computing device(s) 106, such as and without limitation one or more instructions for the messaging application to open a user-identified message, such as in a case that the user wishes to read, forward and/or reply to the identified message, to open a new message, such as in a case that the user wishes to compose a new message, or to perform a search for messages that satisfy a user-specified search criteria, such as in a case that the user wishes to search for messages satisfying the user-specified search criteria.

In accordance with one or more embodiments, an event, which may be stored in the event library 104, may comprise information identifying the user making the request, information identifying the message upon which the user wishes, or intends, to act, information identifying the user's intent, e.g., the user's intended messaging action(s), information identifying the one or more second computing device(s) 106. Such information may be stored as one or more properties of an event, which properties may include user, message, intent and device properties. An event may further comprise one or more behavior properties, such as and without limitation a notification/reminder behavior property, such as and without limitation a property indicating that an alert is to be transmitted to the second computer device(s) 106 periodically, e.g., once an hour. An event may comprise a property storing a user-specified search criteria. Of course, it should be apparent that other properties may be associated with an event.

In accordance with one or more embodiments, information identifying the user and the user's intent may be required for an event, while other properties may or may not have associated data, which may be dependent on the type of event. The following provides some example use cases and example property information associated with each use case.

In a first example use case, a user, John, is unable to finish reading an email at home on his desktop computing device 106, e.g., John needs to leave to catch a flight. John provides input via a user interface provided at John's desktop computing device 106, e.g., John selects the email and one or more icons or other input controls/indicator(s), to indicate John's intent to read the email using his mobile phone computing device 106. A request may be sent to the integrator 103, and in response, the integrator 102 may generate and store an event that has associated user, message, intent and device property data identifying the user as John, identifying the message that John wishes to read using his mobile phone computing device 106, identifying John's intended messaging action as a read message action, and identifying the device as John's mobile phone computing device 106. The event generated by the integrator 102 may result in John being presented with a reminder on his mobile phone computing device 106, e.g., when John loads the email client at his mobile phone computing device 106, to read the email message. The reminder may be selectable by John to open the email message. As yet another example, the result may comprise an operation being performed to automatically open the email at John's mobile phone computing device 106, e.g., at the time the event notification is received at John's mobile phone or some other time. The result may be in response to an event notification being transmitted by the integrator 102 to John's mobile phone computing device 106.

In another example use case, the user, John, reads a message from another user, Sally, on his tablet computing device 106, and John wishes to reply to Sally's message and include in attachment from John's desktop computing device 106. John provides input via a user interface provided at John's tablet computing device 106, e.g., John selects the email and one or more icons or other control(s)/indicator(s), to indicate John's intent to reply to Sally's email using his desktop computing device 106. A request may be sent to the integrator 103, and in response, the integrator 102 may generate and store an event that has associated user, message, intent and device properties identifying the user as John, identifying the message to which John wishes to reply as Sally's email message, identifying John's intended messaging action as a reply message action, and identifying the device as John's desktop computing device 106. The event generated by the integrator 102 may result in John being presented with a reminder on his desktop computing device 106, e.g., when John loads the email client at his desktop computing device 106, to reply to Sally's email message. The reminder may be selectable by John to open the email message. As yet another example, the result may comprise an operation being performed to automatically open the email at John's desktop computing device 106, e.g., at the time the event notification is received at John's desktop or some other time. The result may be in response to an event notification being transmitted by the integrator 102 to John's desktop computing device 106.

As yet another non-limiting example use case, the user, John, is reading mail on his desktop computing device 106, and decides that he wants to send a new message to Sally with a picture that he is not yet taken, e.g., a picture of the Golden Gate Bridge. John provides input via a user interface provided at John's desktop computing device 106, e.g., John selects one or more icons or other control(s/indicator(s), to indicate John's intent to compose a new message using his mobile phone computing device 106. A request may be sent to the integrator 103, and in response, the integrator 102 may generate and store an event that has associated user, intent and device properties identifying the user as John, identifying John's intended messaging action as a compose message action, and identifying the device as John's mobile phone computing device 106. Since John is composing a new email message, the event's message property does not identify an existing email message. The event generated by the integrator 102 may result in John being presented with a reminder on his mobile phone computing device 106, e.g., when John loads the client application at his mobile phone computing device 106 and/or when John is in the vicinity of the Golden Gate Bridge as may be determined using the global positioning system (GPS) of John's mobile phone computing device 106, to compose a new message to Sally. The reminder may be selectable by John, and once selected, John may be presented with a compose experience where John may take one or more photos of the bridge and click "send." As yet another example, the result may be that the compose experience may be presented to John when John accesses his mobile phone computing device 106 and/or when John is in the vicinity of the Golden Gate Bridge. The result may be in response to an event notification being transmitted by the integrator 102 to John's mobile phone computing device 106.

In accordance with one or more embodiments, integrator 102 may be implemented by one or more computing devices. By way of a non-limiting example, the one or more computing devices may comprise one or more user computing devices 106, one or more server computing devices, which server computing device(s) may be implementing the messaging service(s) 110, some combination of user computing device(s) and server computing device(s), or one or more computing devices separate from the computing device(s) 106 and the server computing(s) implementing the messaging service(s) 110, etc.

In accordance with one or more embodiments, integrator 102 may be implemented as a cloud computing service. Alternatively and in accordance with one or more embodiments, events based on actions taken by users may be stored as metadata by a metadata system, which keeps track of events. Upon user login at the second computing device(s) 106, outstanding events might be fetched, e.g., from the event library 104 of the cloud computing service or of the metadata system. Additionally, or alternatively, aperiodic polling of the event library 104 may be used to fetch events, e.g., any new event(s) created after the user has logged in at the second computing device 106. Some or all of the information, e.g., property data, stored for an event and fetched may be included in a display at the second computing device(s) 106, such as in a reminder presented at the user's second computing device 106. As yet another non-limiting alternative, a computing device, such as an event server computing device implementing integrator 102, might push an event to a user computing device 106 using a push mechanism.

Figure 3A:
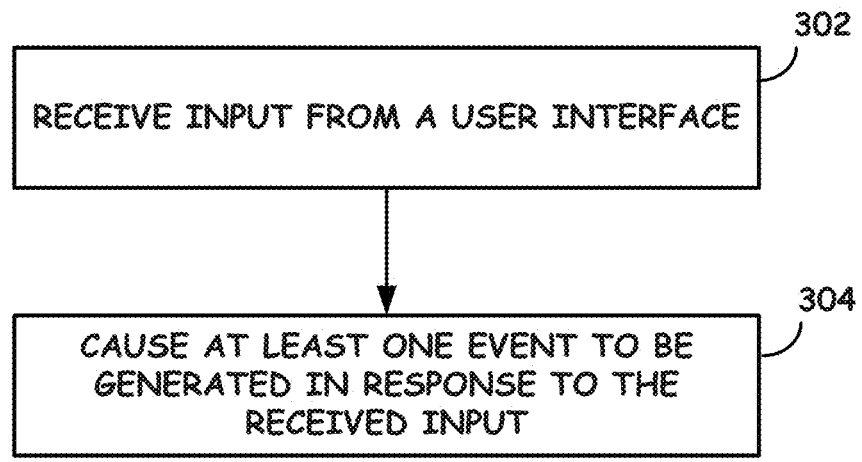
Figure 3B:
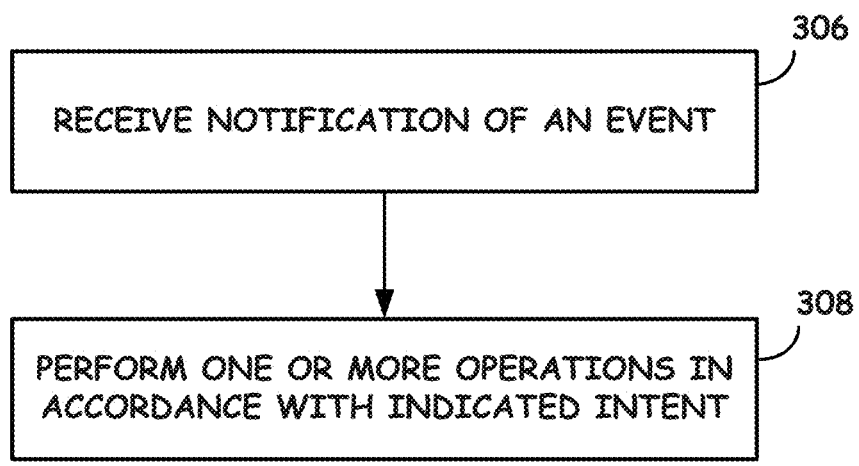

FIG. 3, which comprises FIGS. 3A and 3B, provides process flow examples which may be implemented by a user computing device in accordance with one or more embodiments of the present disclosure. With reference to FIG. 3A, at step 302, input is received from a user interface display at a first user computing device 106. The input may comprise information indicating the user's intent to perform at least one messaging action at one or more second computing devices 106 other than, e.g., different from, the first user computing device 106.

At step 304, the first user computing device 106 causes one or more events to be generated, each event corresponding to a messaging action and comprising information identifying the at least one second user computing device 106 different from the first user computing device 106 and identifying the messaging action. By way of a non-limiting example, the first user computing device 106 may cause the messaging event(s) to be generated by transmitting a request to generate the event(s) to the integrator 102, which request may comprise information identifying the user and information for use in identifying the at least one messaging action and the second user computing device(s) 106.

The second user computing device(s) 106 might be explicitly identified by the user at the time that the user provides the input indicating the user's intent to perform the messaging action. By way of a non-limiting example, a user interface may provide the user with a list of the user's second user computing device(s) 106 in connection with the user's intent input, so that the user may select one or more second user computing(s) 106. By way of a further non-limiting example, a messaging action may have associated default settings that may be used to identify the user's second user computing device(s) 106. Alternatively, the second user computing device(s) 106 might be identified in user preferences specified by the user and/or for the user, which preferences might associate one or more of the second user computing device(s) 106 with certain messaging action(s). The one or more second user computing device(s) 106 might be implied based on past behavior of the user and/or past behavior of other users.

With reference to FIG. 3B, information identifying a user's intent to perform a messaging action may be received by a user computing device 106, which may be a second user computing device, at step 306. The information may be in the form of a notification of an event. The information may be received from integrator 102, for example. The event may be one generated by the integrator 1092 in response to receipt of a request received from another, e.g., a first, user computing device 106, e.g., a first user computing device 106 different from the second user computing device 106 receiving the information at step 306. The information may comprise data for one or more event properties, including data identifying the user and the user's intended messaging action.

The received information may identify one or more operations to be performed by the user computing device 106 in connection with the user's intended message action. At step 308, the user computing device 106 may perform any such operations. By way of a non-limiting example, the user computing device 106 may present a reminder, e.g., display a visual reminder and/or play an audio reminder, to remind the user of the user's intent to perform the messaging action. By way of a further non-limiting example, the user computing device 106 might open an identified message, e.g., a message identified in the received event notification information, e.g., in the event's message property, create a new message, etc.

FIG. 4, which comprises FIGS. 4A, 4B and 4C, provide examples of a user interface of a user computing device for use in accordance with one or more embodiments of the present disclosure. While the user interface examples are provided with respect to a mobile phone, it should be apparent that the same or a similar user interface, or even a different user interface, may be used with any type of user computing device. Additionally and in the examples provided in FIGS. 4 and 5, the mobile phone is one example of the user computing device 106 of FIG. 1.

With reference to FIG. 4A, the user computing device 402 comprises a display 404 of a messaging client application user interface, such as may be provided by an email messaging client application. In the example user interface provided in FIG. 4, a number of email messages from the user's email inbox folder are listed, together with search field 410 for searching a messaging folder, which is the user's inbox in the example. An icon 406 is selectable by the user to create a new message, and icon 408 is selectable to open a menu of options selectable by the user.

Each email message in the list may comprise some or all of the contents of the message. With reference to FIG. 4B, in response to the user selecting an email message entry, e.g., email message entry 412, one or more user-selectable icons 412 may be displayed to the user in place of the display of the email message's contents. Icons 412 may comprise one or more icons selectable by the user and indicative of the user's intent to perform at least one messaging action at one or more second user computing device(s) 106. By way of a non-limiting example, icons 416 and 418 may be selectable by the user to indicate the user's intent to read the email message corresponding to entry 412 at another user computing device(s) 106. By way of a non-limiting example, icon 416 might indicate the user's intent to defer the messaging action, e.g., opening and reading, to a later time, while icon 418 might indicate the user's intent to perform the messaging action without deferring to a later time, e.g., performing the messaging action in a present time period.

In response to the user's selection of icon 416 or 418, the user interface display 404 may include a message such as message 414 shown in the example of FIG. 4C. In the example, message 414 is displayed to notify the user that a request has been sent in accordance with the user's input indicating the user's intent to perform the messaging action at one or more user second computing device(s) 106.

In accordance with one or more embodiments, user selection of either icon 416 or icon 418 may cause integrator 102 to create at least one event and the corresponding event data, which is stored in event library 104. In response to user selection of either icon 416 or icon 418, the integrator 102 may also forward a notification of the event to the one or more second computing device(s) 106. In the case of user selection of icon 416, the event notification may be delayed based on a timing specified by the user, a timing determined based on availability of a messaging client application at the second computing device(s) 106. In the case of user selection of icon 418, the event notification may be sent without delay based on an availability of a messaging client application at the second computing device(s) 106, for example.

In accordance with one or more embodiments, receipt of an event notification corresponding to the user's input indicative of the user's intent to read an email message at one or more second user computing device(s) 106, may result in a client application executing at the second user computing device(s) 106 opening the email message and displaying the email message for the user. Alternatively, receipt of the event notification may result in a reminder being presented to the user, which reminder may remind the user of the user's intent to read the email at the second user computing device 106. The reminder might be selectable by the user to open the email message that the user intended to read at the second user computing device 106.

Figure 5C:
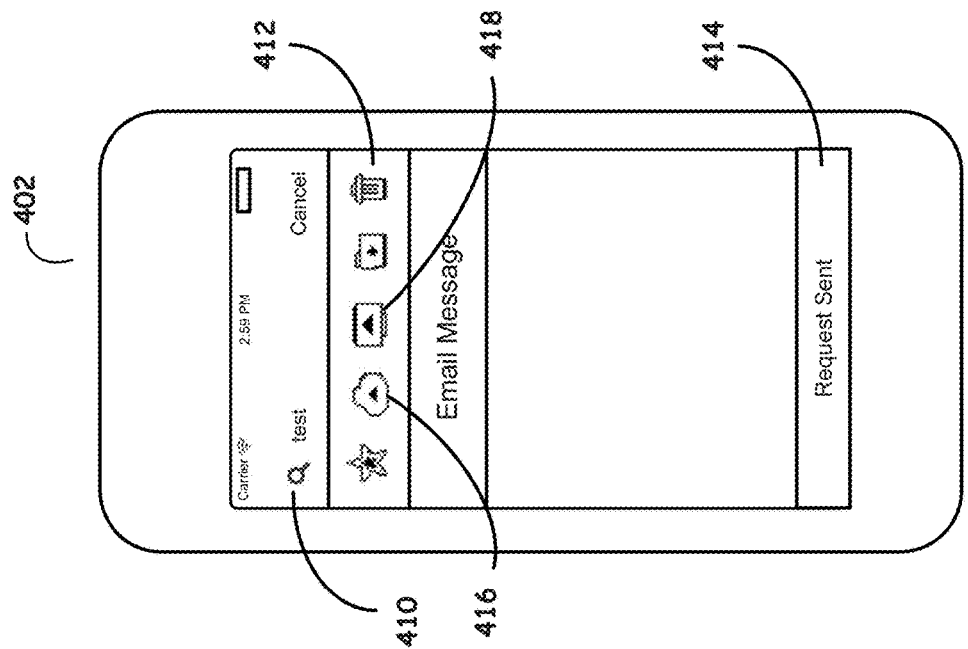
Figure 5B:
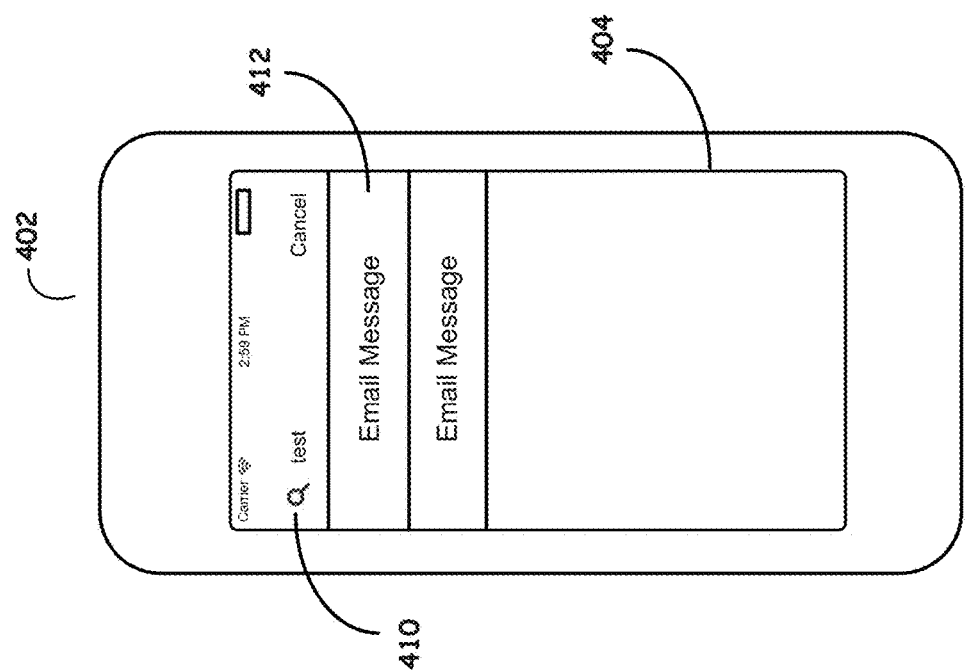

Referring again to FIG. 4A, the user may elect to perform a search by entering a search criteria in the search field 410 of display 404. Additionally, the user may indicate the user's intent to perform the search at one or more second computing device(s) 106. FIG. 5, which comprises FIGS. 5A, 5B and 5C, provide examples of the user interface 404 in connection with a search. With reference to FIG. 5A, display 404 includes search criteria, e.g., "test", input by the user into search field 410. In response, the display 404 is updated, as in FIG. 5B, and includes those email messages that satisfy the user's search criteria. The user may select one of the email messages to display icons 412, which include icons 416 and 418. With reference to FIG. 5B, the user might select entry 412, and FIG. 5B provides an example of display 404 of mobile phone 402 in response to the user's selection of entry 412.

In response to the user's selection of icon 416 or 418, the user interface display 404 may include message 414 shown in the example of FIG. 5C. In the example, message 414 is displayed to notify the user that a request has been sent in accordance with the user's input indicating the user's intent to perform the messaging action at one or more user second computing device(s) 106.

In accordance with one or more embodiments, user selection of either icon 416 or icon 418 may cause integrator 102 to create at least one event and the corresponding event data, which is stored in event library 104. In response to user selection of either icon 416 or icon 418, the integrator 102 may also forward a notification of the event to the one or more second computing device(s) 106. In the case of user selection of icon 416, the event notification may be delayed based on the timing specified by the user, a timing determined based on availability of a messaging client application at the second computing device(s) 106. In the case of user selection of icon 418, the event notification may be sent without delay based on an availability of a messaging client application at the second computing device(s) 106.

In accordance with one or more embodiments, receipt of an event notification corresponding to the user's input indicative of the user's intent to perform a search at one or more second user computing device(s) 106, may result in a client application executing at the second user computing device(s) 106 performing the search using the user's search criteria, e.g., "test", and displaying the results of the search. By way of a non-limiting example, the client application may display a listing of the email messages in the user's email inbox that satisfy the user's search criteria. Alternatively, receipt of the event notification may result in a reminder being presented to the user, which reminder may remind the user of the user's intent to perform a search of the user's inbox using the indicated search criteria at the second user computing device 106. The reminder might be selectable by the user to initiate the search.

By way of a non-limiting example, FIG. 5B provides an example of display 404, which may be presented to the user in response to an event being received by mobile phone 402, as a second user computing device 106, which event may have been generated, and transmitted to mobile phone 402, by the integrator 102 in response to input received by the user using another user computing device 106 as the first user computing device.

Referring again to FIG. 4A, icon 406, which is selectable by the user to compose a new email message, may result in the display of icons 412 giving the user the option to indicate, by selecting either icon 416 or icon 418, the user's intent to compose a new email message at a second user computing device 106. Icon 408, which is selectable by the user to display menu options, may provide the user with options for specifying one or more second user computing device(s) 106.

Figure 6:
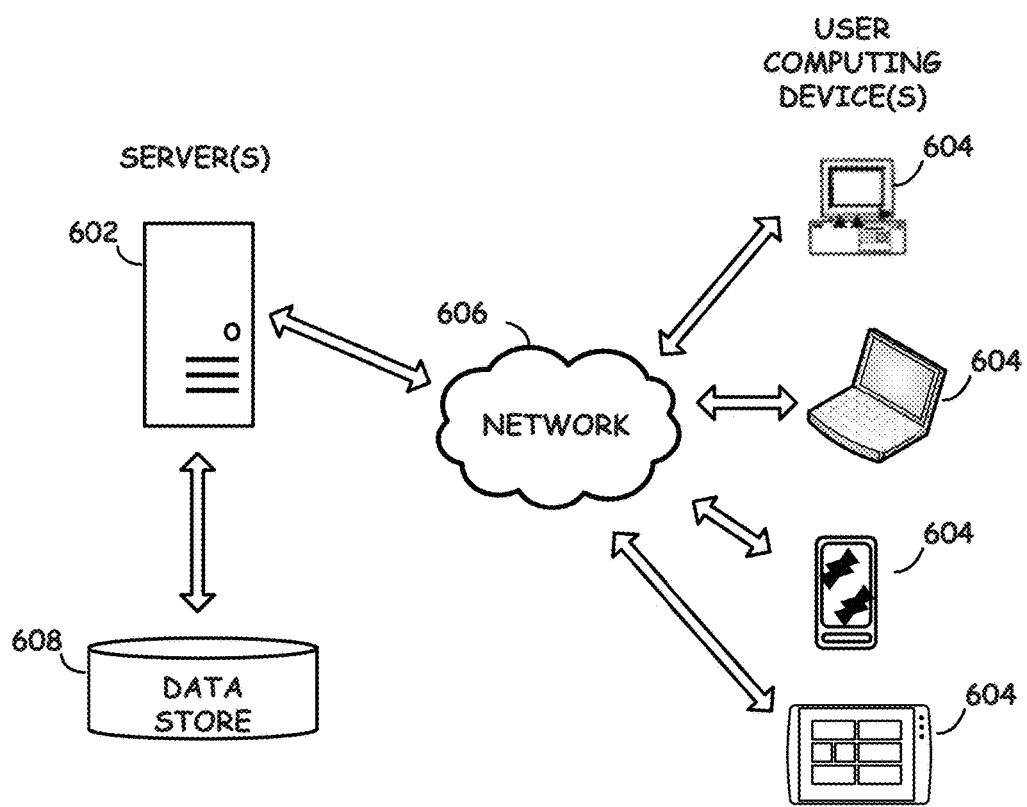
FIG. 6 illustrates some components that may be used in connection with one or more embodiments of the present disclosure.

FIG. 6 illustrates some components that may be used in connection with one or more embodiments of the present disclosure. In accordance with one or more embodiments of the present disclosure, one or more computing devices, e.g., one or more servers, user computing devices or other computing device, are configured to comprise functionality described herein. For example, a computing device 602 may be configured to execute program code, instructions, etc. to provide functionality in accordance with one or more embodiments of the present disclosure. The same or another computing device 602 may be configured to execute program code to implement functionality in accordance with one or more embodiments of the present disclosure.

Computing device 602 can serve content to user computing devices 604 using a browser application via a network 606. Data store 608, which may include event library 104, may be used to store program code to configure a server 602 to functionality in accordance with one or more embodiments of the present disclosure.

The user computing device 604, which may correspond to user computing device 106, may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 602 and the user computing device 604 can include one or more processors, memory, a removable media reader, network interface, display and interface, and one or more input devices, e.g., keyboard, keypad, mouse, etc. and input device interface, for example. One skilled in the art will recognize that server 602 and user computing device 604 may be configured in many different ways and implemented using many different combinations of hardware, software, or firmware.

In accordance with one or more embodiments, a computing device 602 can make a user interface available to a user computing device 604 via the network 606. The user interface made available to the user computing device 604 can include content items, or identifiers (e.g., URLs) selected for the user interface in accordance with one or more embodiments of the present invention. In accordance with one or more embodiments, computing device 602 makes a user interface available to a user computing device 604 by communicating a definition of the user interface to the user computing device 604 via the network 606. The user interface definition may be specified using any of a number of languages, including without limitation a markup language such as Hypertext Markup Language, scripts, applets and the like. The user interface definition may be processed by an application executing on the user computing device 604, such as a browser application, to output the user interface on a display coupled, e.g., a display directly or indirectly connected, to the user computing device 604.

In an embodiment the network 606, which may correspond to network 108, may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure may be implemented in a client-server environment such as that shown in FIG. 6. Alternatively, embodiments of the present disclosure may be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

FIG. 7 is a detailed block diagram illustrating an internal architecture of a computing device, e.g., a computing device such as server 602 or user computing device 604, in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 720 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, may be accessed by CPU 712 during the execution of computer-executable process steps.

Persistent storage, e.g., medium/media 706, may be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which may be used to tangibly store the desired information or data or instructions and which may be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

receiving, by at least one computing device and via a user interface of a first computing device, a selection, by a user, of a message displayed in a listing of messages in the user interface;

providing, by the at least one computing device and in response to the user's selection of the message, the user interface to the first computing device, the user interface comprising, in place of the selected message's display in the user interface, user-selectable indicia to indicate a user's intent to perform a messaging action using at least one other second computing device, the user-selectable indicia comprising a first indicium selectable by the user to indicate, upon selection, the user's intent to defer the messaging action corresponding to the first indicium to a later time and a second indicium selectable by the user to indicate the user's intent to perform the messaging action presently without deferring to a later time;

receiving, by the at least one computing device and via the second user-selectable indicium of the user interface, a user request, from the first computing device, the user request received from the first computing device comprising information indicating the user's intent to perform, using the at least one other second computing device, the messaging action in connection with the selected message, the user's intent, indicated upon selection of the second indicium and received from the first device with the user request, indicating that performance of the messaging action using the at least one second computing device is to be deferred to a later time;

generating, by the at least one computing device and in response to the received request, a messaging event, the messaging event corresponding to the messaging action and comprising information identifying the at least one second computing device different than the first computing device usable to perform the messaging action;

generating, by the at least one computing device, at least one notification of the event for transmission to the at least one second computing device, the at least one notification comprising information about the messaging action; and transmitting, by the at least one computing device, the at least one notification of the event to the at least one second computing device, event notification transmission comprising making a determination, using the user's intent, indicated upon the user's selection of the second indicium and received with the user request, whether or not to defer the event notification transmission and making the event notification transmission in accordance with the determination.

2. The method of claim 1, the first computing device comprising a mobile computing device and the at least one second computing device comprising a desktop computing device.

3. The method of claim 1, the first computing device comprising a desktop computing device and the at least one second computing device comprising a mobile computing device.

4. The method of claim 1, the user request is received from a first messaging application and the at least one action is to be performed using a second messaging application.

5. The method of claim 1, the generating further comprising:

generating the at least one notification of the event in accordance with the determination made using the user's intent received with the user request.

6. The method of claim 1, the user request is received from a messaging application open at the first computing device, and the at least one notification of the event is generated for transmission to a second computing device of the at least one second computing device based on an indication that a messaging application is also open at the second computing device.

7. The method of claim 1, the at least one notification's information about the messaging action comprising search criteria and instructions to perform a search of at least one messaging folder using the search criteria.

8. The method of claim 1, the at least one notification's information comprising information to be displayed to the user as a reminder of the user's intent to perform the corresponding messaging action.

9. The method of claim 1, the messaging action corresponding to the first indicium comprises a message read action and the at least one notification's information identifying the message and comprising instructions to open the identified message for the user.

10. The method of claim 1, the messaging action corresponding to the first indicium comprises a message reply action and the at least one notification's information identifying the message and comprising instructions to open the identified message for the user.

11. The method of claim 1, the messaging action corresponding to the first indicium comprises a compose message action and the at least one notification's information comprising instructions to open a new message for the user.

12. The method of claim 1, the second indicium selectable by the user to indicate the user's intent to perform the messaging action presently, at the at least one second computing device, without deferring to a later time.

13. A method comprising:

receiving input via a user interface and from a first computing device, the user interface comprising a number of user-selectable options in connection with a selected message, the number of user-selectable options comprising a first option selectable by the user to indicate, upon selection, the user's intent to defer performance of a messaging action, in connection with the selected message, to a later time and on a second device and a second option selectable by the user to indicate, upon selection, the user's intent to perform the messaging action without deferring to a later time, the received input indicating the user's selection of the second option; and causing, by the first computing device and in response to the received input, a messaging event to be generated, the messaging event corresponding to the messaging action and comprising information identifying at least one second computing device different than the first computing device and identifying the messaging action, the messaging event is to be transmitted to the at least one second computing device in accordance with a determination made using the user's intent, indicated upon selection of the first option by the user, whether or not to defer event notification.

14. The method of claim 13, causing the messaging event to be generated further comprising:
transmitting, by the first computing device to at least one server computing device, a request to generate the messaging event, the request comprising information identifying the user and information for use in identifying the messaging action and the at least one second computing device.

15. The method of claim 13, the first computing device comprising a mobile computing device and the at least one second computing device comprising a desktop computing device.

16. The method of claim 13, the first computing device comprising a desktop computing device and the at least one second computing device comprising a mobile computing device.

17. The method of claim 13, the user input comprising an indication whether or not the user's intent is to defer performance of the messaging action, the indication determining a timing of at least one reminder to notify the user at the at least one second computing device of the user's intent to perform the messaging action.

18. The method of claim 13, further comprising:
receiving, at the first computing device and from a computing device other than the first computing device, information identifying the user's intent to perform a messaging action at the first computing device; and
displaying, at the first computing device, at least one reminder of the messaging action that is to be performed at the first computing device.

19. The method of claim 18, the at least one reminder is displayed in accordance with a user-specified timing for the at least one reminder.

20. The method of claim 18, the received information comprising information instructing the first computing device to display the at least one reminder in connection with a messaging client application at the first computing device.

21. The method of claim 20, the method further comprising:
determining, by the first computing device, whether the messaging client application is executing at the first computing device;
the displaying further comprising:
displaying the at least one reminder of the messaging action if it is determined that the messaging client application is executing at the first computing device; and
if it is determined that the messaging client is not executing on the first computing device, waiting to display the at least one reminder of the messaging action until the messaging client application is invoked at the first computing device.

22. A system comprising:
at least one computing device comprising one or more processors to execute and memory to store instructions to:
receive, via a user interface of a first computing device, a selection, by a user, of a message displayed in a listing of messages in the user interface;
provide, in response to the user's selection of the message, the user interface to the first computing device, the user interface comprising, in place of the selected message's display in the user interface, user-selectable indicia to indicate a user's intent to perform a messaging action using at least one other second computing device, the user-selectable indicia comprising a first indicium selectable by the user to indicate, upon selection, the user's intent to defer the a messaging action corresponding to the first indicium to a later time and a second indicium selectable by the user to indicate the user's intent to perform the messaging action presently without deferring to a later time;
receive, via the second user-selectable indicium of the user interface, a user request from a first computing device, the user request received from the first computing device comprising information indicating the user's intent to perform, using the at least one other second computing device, the messaging action in connection with the selected message, the user's intent, indicated upon selection of the second indicium and received from the first device with the user request, indicating that performance of the messaging action using the at least one second computing device is to be deferred to a later time;
generate, in response to the received request, a messaging event, the messaging event corresponding to the messaging action and comprising information identifying at least one second computing device different than the first computing device usable to perform the messaging action;
generate at least one notification of the event for transmission to the at least one second computing device, the at least one notification comprising information about the messaging action; and
transmit the at least one notification of the event to the at least one second computing device, event notification transmission comprising making a determination, using the user's intent, indicated upon the user's selection of the second indicium and received with the user request, whether or not to defer the event notification transmission and making the event notification transmission in accordance with the determination.

23. The system of claim 22, the first computing device comprising a mobile computing device and the at least one second computing device comprising a desktop computing device.

24. The system of claim 22, the first computing device comprising a desktop computing device and the at least one second computing device comprising a mobile computing device.

25. The system of claim 22, the user request is received from a first messaging application and the at least one action is to be performed using a second messaging application.

26. The system of claim 22, the instructions to generate further comprising instructions to:

generate the at least one notification of the event using a timing specified by in accordance with the determination using the user's intent received with the user request.

27. The system of claim 22, the user request is received from a messaging application open at the first computing device, and the at least one notification of the event is generated for transmission to a second computing device of the at least one second computing device based on an indication that a messaging application is also open at the second computing device.

28. The system of claim 22, the at least one notification's information about the messaging action comprising search criteria and instructions to perform a search of at least one messaging folder using the search criteria.

29. The system of claim 22, the at least one notification's information comprising information to be displayed to the user as a reminder of the user's intent to perform the corresponding messaging action.

30. The system of claim 22, the messaging action corresponding to the first indicium comprises a message read action and the at least one notification's information identifying the message and comprising instructions to open the identified message for the user.

31. The system of claim 22, the messaging action corresponding to the first indicium comprises a message reply action and the at least one notification's information identifying the message and comprising instructions to open the identified message for the user.

32. The system of claim 22, the messaging action corresponding to the first indicium comprises a compose message action and the at least one notification's information comprising instructions to open a new message for the user.

33. The system of claim 22, the second indicium selectable by the user to indicate the user's intent to perform the messaging action presently, at the at least one second computing device, without deferring to a later time.

34. A system comprising:
at least one computing device comprising one or more processors to execute and memory to store instructions to:
receive input from a user interface display at a first computing device, the user interface comprising a number of user-selectable options in connection with a selected message, the number of user-selectable options comprising a first option selectable by the user to indicate, upon selection, the user's intent to defer performance of a messaging action, in connection with the selected message, to a later time and on a second device and a second option selectable by the user to indicate, upon selection, the user's intent to perform the messaging action without deferring to a later time, the received input indicating the user's selection of the second option; and
cause, in response to the received input, a messaging event to be generated, the messaging event corresponding to the messaging action and comprising information identifying at least one second computing device different than a first computing device and identifying the messaging action, the messaging event is to be transmitted to the at least one second computing devices in accordance with a determination made using the user's intent, indicated upon selection of the first option by the user, whether or not to defer event notification.

35. The system of claim 34, the instructions to cause the messaging event to be generated further comprising instructions to:
transmit, to at least one server computing device, a request to generate the messaging event, the request comprising information identifying the user and information for use in identifying the messaging action and the at least one second computing devices.

36. The system of claim 34, the first computing device comprising a mobile computing device and the at least one second computing device comprising a desktop computing device.

37. The system of claim 34, the first computing device comprising a desktop computing device and the at least one second computing device comprising a mobile computing device.

38. The system of claim 34, an indication whether or not the user's intent is to defer performance of the messaging action, the indication determining a timing of at least one reminder to notify the user at the at least one second computing device of the user's intent to perform the messaging action.

39. The system of claim 34, the instructions further comprising instructions to:
receive, at the first computing device and from a computing device other than the first computing device, information identifying the user's intent to perform a messaging action at the first computing device; and
display, at the first computing device, at least one reminder of the messaging action that is to be performed at the first computing device.

40. The system of claim 39, the at least one reminder is displayed in accordance with a user-specified timing for the at least one reminder.

41. The system of claim 39, the received information comprising information instructing the first computing device to display the at least one reminder in connection with a messaging client application at the first computing device.

42. The system of claim 41, the instructions further comprising instructions to:
determine, by the first computing device, whether the messaging client application is executing at the first computing device;
the instructions to display further comprising instructions to:
display the at least one reminder of the messaging action if it is determined that the messaging client application is executing at the first computing device; and
if it is determined that the messaging client is not executing on the first computing device, wait to display the at least one reminder of the messaging action until the messaging client application is invoked at the first computing device.

43. A computer readable non-transitory storage medium for tangibly storing thereon computer readable instructions that when executed cause at least one processor to:
receive, via a user interface of a first computing device, a selection, by a user, of a message displayed in a listing of messages in the user interface;
in response to the user's selection of the message, provide the user interface to the first computing device, the user interface comprising, in place of the selected message's display in the user interface, user-selectable indicia to indicate a user's intent to perform a messaging action using at least one other second computing device, the user-selectable indicia comprising a first indicium selectable by the user to indicate, upon selection, the user's intent to defer the messaging action corresponding to the first indicium to a later time and a second indicium selectable by the user to indicate the user's intent to perform the messaging action presently without deferring to a later time;

receive, via the second user-selectable indicium of the user interface, a user request from the first computing device, the user request received from the first computing device comprising information indicating the user's intent to perform, using the at least one other second computing device, the messaging action in connection with the selected message, the user's intent, indicated upon selection of the second indicium and received from the first device with the user request, indicating that performance of the messaging action using the at least one second computing device is to be deferred to a later time;

generate, in response to the received request, a messaging event, the messaging event corresponding to the messaging action and comprising information identifying at least one second computing device different than the first computing device usable to perform the messaging action;

generate at least one notification of the event for transmission to the at least one second computing device, the at least one notification comprising information about the messaging action; and transmitting, by the at least one computing device, the at least one notification of the event to the at least one second computing device, event notification transmission comprising making a determination, using the user's intent, indicated upon the user's selection of the second indicium and received with the user request, whether or not to defer the event notification transmission and making the event notification transmission in accordance with the determination.

44. The computer readable non-transitory storage medium of claim 43, the first computing device comprising a mobile computing device and the at least one second computing device comprising a desktop computing device.

45. The computer readable non-transitory storage medium of claim 43, the first computing device comprising a desktop computing device and the at least one second computing device comprising a mobile computing device.

46. The computer readable non-transitory storage medium of claim 43, the user request is received from a first messaging application and the at least one action is to be performed using a second messaging application.

47. The computer readable non-transitory storage medium of claim 43, the instructions to generate further comprising instructions to:
generate the at least one notification of the event in accordance with the determination made using the user's intent received with the user request.

48. The computer readable non-transitory storage medium of claim 43, the user request is received from a messaging application open at the first computing device, and the at least one notification of the event is generated for transmission to a second computing device of the at least one second computing device based on an indication that a messaging application is also open at the second computing device.

49. The computer readable non-transitory storage medium of claim 43, the at least one notification's information about the messaging action comprising search criteria and instructions to perform a search of at least one messaging folder using the search criteria.

50. The computer readable non-transitory storage medium of claim 43, the at least one notification's information comprising information to be displayed to the user as a reminder of the user's intent to perform the corresponding messaging action.

51. The computer readable non-transitory storage medium of claim 43, the messaging action corresponding to the first indicium comprises a message read action and the at least one notification's information identifying the message and comprising instructions to open the identified message for the user.

52. The computer readable non-transitory storage medium of claim 43, the messaging action corresponding to the first indicium comprises a message reply action and the at least one notification's information identifying the message and comprising instructions to open the identified message for the user.

53. The computer readable non-transitory storage medium of claim 43, the messaging action corresponding to the first indicium comprises a compose message action and the at least one notification's information comprising instructions to open a new message for the user.

54. The computer readable non-transitory storage medium of claim 43, the second indicium selectable by the user to indicate the user's intent to perform the messaging action presently, at the at least one second computing device, without deferring to a later time.

55. A computer readable non-transitory storage medium for tangibly storing thereon computer readable instructions that when executed cause at least one processor to:
receive input via a user interface and from a first computing device, the user interface comprising a number of user-selectable options in connection with a selected message, the number of user-selectable options comprising a first option selectable by the user to indicate, upon selection, the user's intent to defer performance of a messaging action, in connection with the selected message, to a later time and on a second device and a second option selectable by the user to indicate, upon selection, the user's intent to perform the messaging action without deferring to a later time, the received input indicating the user's selection of the second option; and
cause, in response to the received input, a messaging event to be generated, the messaging event corresponding to the messaging action and comprising information identifying at least one second computing device different than a first computing device and identifying the messaging action, the messaging event is to be transmitted to the at least one second computing device in accordance with a determination made using the user's intent, indicated upon selection of the first option by the user, whether or not to defer event notification.

56. The computer readable non-transitory storage medium of claim 55, the instructions to cause messaging event to be generated further comprising instructions to:
transmit, to at least one server computing device, a request to generate the messaging event, the request comprising information identifying the user and information for use in identifying the messaging action and the at least one second computing device.

57. The computer readable non-transitory storage medium of claim 55, the first computing device comprising a mobile computing device and the at least one second computing device comprising a desktop computing device.

58. The computer readable non-transitory storage medium of claim 55, the first computing device comprising a desktop computing device and the at least one second computing device comprising a mobile computing device.

59. The computer readable non-transitory storage medium of claim 55, an indication whether or not the user's intent is to defer performance of the messaging action, the indication determining a timing of at least one reminder to notify the user at the at least one second computing device of the user's intent to perform the messaging action.

60. The computer readable non-transitory storage medium of claim 55, the instructions further comprising instructions to:
  receive, at the first computing device and from a computing device other than the first computing device, information identifying the user's intent to perform a messaging action at the first computing device; and
  display, at the first computing device, at least one reminder of the messaging action that is to be performed at the first computing device.

61. The computer readable non-transitory storage medium of claim 60, the at least one reminder is displayed in accordance with a user-specified timing for the at least one reminder.

62. The computer readable non-transitory storage medium of claim 60, the received information comprising information instructing the first computing device to display the at least one reminder in connection with a messaging client application at the first computing device.

63. The computer readable non-transitory storage medium of claim 62, the instructions further comprising instructions to:
  determine, by the first computing device, whether the messaging client application is executing at the first computing device;
  the instructions to display further comprising instructions to:
  display the at least one reminder of the messaging action if it is determined that the messaging client application is executing at the first computing device; and
  if it is determined that the messaging client is not executing on the first computing device, wait to display the at least one reminder of the messaging action until the messaging client application is invoked at the first computing device.

* * * * *